United States Patent [19]

Lenssen

[11] 3,866,058
[45] Feb. 11, 1975

[54] POWER-GENERATING SYSTEM AND METHOD

[75] Inventor: Gerhard Lenssen, Bernkastel, Germany

[73] Assignee: Rheinisch-Westfalisches Elektrizitatswerk AG, Essen, Germany

[22] Filed: July 23, 1973

[21] Appl. No.: 381,434

[30] Foreign Application Priority Data
July 22, 1972 Germany............................ 2236059
Sept. 8, 1972 Germany............................ 2244084

[52] U.S. Cl........................ 290/52, 60/39.02, 61/.5
[51] Int. Cl. .............................................. F02c 3/12
[58] Field of Search ............ 290/2, 1, 52; 60/39.02; 61/.5

[56] References Cited
UNITED STATES PATENTS

| | | | |
|---|---|---|---|
| 2,413,243 | 12/1946 | Neff | 61/.5 |
| 2,579,005 | 12/1951 | Lambert | 61/.5 |
| 2,947,147 | 8/1960 | Johnson | 60/.5 |
| 3,519,076 | 7/1970 | Walker | 61/.5 |
| 3,523,192 | 8/1970 | Lang | 290/52 |
| 3,643,426 | 2/1972 | Janelid | 290/52 |

*Primary Examiner*—G. R. Simmons
*Attorney, Agent, or Firm*—Karl F. Ross; Herbert Dubno

[57] ABSTRACT

A system for the generation of electrical energy has a generator driven by a gas turbine which is fed by a compressor and, at least at peak periods or intermittently, with compressed air from a subterranean storage chamber in which the air is under hydrostatic pressure. The system thus includes a subterranean cavern in which the air is stored, a reservoir containing water at a level above the cavern and a passage connecting the reservoir with the cavern. Within the cavern there is provided a downwardly open bell-shaped hood of fluid-impermeable, preferably foil, material, such that the water may rise between the hood and the cavern wall. The system is designed such that, in the fully charged condition of the chamber, the water level is above the lower edge or mouth of the hood whereas in the discharged condition, an air cushion remains in the region of the roof or head of the chamber.

8 Claims, 5 Drawing Figures

POWER-GENERATING SYSTEM AND METHOD

Field of the Invention

The present invention relates to a method of and a system for the generation of electrical energy and, more particularly, to a system for producing electrical energy and a method of operating a generating plant.

Background of the Invention

The generation of electricity using pumped-storage principles has been proposed heretofore to make use of the generating-plant capacity during off-peak hours to store energy in a form which enables it to be converted into electricity during the peak operating hours. The present invention is concerned with that form of pumped storage in which air to be fed to a gas turbine is stored under pressure in a subterranean chamber and is accumulated during off-peak hours so that the air may be fed to the gas turbine during peak hours to recover some of the energy consumed in accumulating the air in the first place.

While there is a drop in efficiency or a loss of power by the use of pumped storage, the loss is compensated by the increased availability of energy during peak hours. Since the energy consumed in storing the gas is off-peak consumption, it allows the generating apparatus to operate at high-efficiency levels substantially continuously.

The invention deals with a pumped-air-storage electrical generating plant which comprises at least one gas turbine arrangement having a gas turbine with usual combusion chamber, an electrical generator mechanically connected to the turbine rotor, a compressor connected to the turbine rotor and communicating with the turbine for supplying air thereto under pressure, and a subterranean air-storage chamber. During the off-peak hours, the compressor may feed air to the subterranean chamber and supply air for continued operation of the turbine while, in peak hours, the compressor may be replaced by the air-storage chamber or the latter may be applied to the turbine.

The subterranean air-storage chamber is usually under hydrostatic pressure, i.e., is connected by a passage to a reservoir containing a liquid whose surface is at atmospheric pressure and lies above the subterranean chamber. The water reservoir applies a substantially constant pressure to the gas within the subterranean chamber inasmuch as the volume of the reservoir may be substantially larger than the volume of the suberranean chamber. The reservoir may thus be a lake or relatively large body of water while the volume of the subterranean cavern is much smaller so that between full charging and discharging thereof, the change in the water head resulting from displacement of the water by the gas or vice versa is relatively small. One of the problems with such pump-air storage is the cost of the structures which may be required in the subterranean chamber. For the most part, it has been necessary to form a storage vessel from concrete and to fully seal the latter both against air and water passage. In other words, the chamber was a space fully enclosed in a man-made wall so designed that both liquid and gas zones within this space were sealed from the surrounding strata. The structure was generally formed from a pair of concrete shells sandwiching a sealing member between them and creating the watertight and airtight structure. The cost of this system was high and the expense was made more pronounced by the fact that the structure was located well below the ground.

Objects of the Invention

It is the principal object of the present invention to provide an improved system for the generation of electricity whereby the aforementioned disadvantages can be obviated.

Another object of the invention is to provide a method of operating an electrical generating plant which is more rational than earlier techniques and results in lower capital operating costs.

Yet another object of the invention is to provide a pumped-air storage plant for the generation of electrical energy in which the subterranean storage of air under pressure is facilitated.

Summary of the Invention

These objects and others which will become apparent hereinafter are attained, in accordance with the invention, in a pumped-air storage plant for the generation of electricity which comprises a gas turbine, a generator connected with the rotor of the gas turbine, a compressor driven to feed air to the combustion chamber of the gas turbine, and a subterranean air-storage chamber adapted to communicate with the combustion chamber of the turbine at least during peak electrical-load periods for supplying air under pressure, the chamber being charged with air from the compressor during off-peak periods constituting a subterranean cavern formed with a downwardly open bell-shaped shell in which a liquid from an equalization reservoir rises and falls as the chamber is discharged or charged with the compressed air. The invention resides in providing the arrangement such that the shell bears against the inner wall of the cavern and has a lower edge open toward the bottom of the cavern so that the shell is generally bell-shaped or hood-shaped and consists of an impermeable foil which need not have any significant internal rigidity but is maintained in an uncollapsed state.

In the full condition of the chamber (fully charged) the equalization liquid level lies above the mouth of the hood or bell while, in the empty or discharged state, there remains an air space or free space in the region of the top of the bell. The "full" state is understood to be the operating condition in which the chamber has a maximum air content while the "empty" state is the condition in the chamber in which its air content has reached the minimum.

It has been found to be undesirable to affix the hood to the inner wall of the cavern over the entire juxtaposed surface areas of the two and, indeed, such mechanical attachement has been found to be unnecessary. Under the conditions stated, it is merely necessary to attach the hood to the inner wall of the cavern at spaced-apart locations and, moreover, only to provide a loose attachment at these locations. The hood preferably consists of a synthetic-resin foil, e.g., polyethylene, although rubber, rubberized fabric or fabric-reinforced synthetic-resin foils may also be used.

According to another feature of the invention, means is provided to communicate between the hood and the cavern wall above and below the level of water in the cavern, a space being maintained between the hood and cavern walls which is connected by a suitable passage to the atmosphere above ground.

The invention discards the previous theories that both air and water seals must be provided for the chamber and substitutes therefor a single air seal. The construction costs are thereby reduced and the pumped-air system made economical especially since the storage chamber can be readily set up in subterranean cavern walls or spaces formed by modern tunneling machinery at especially low cost Description of the Drawing The above and other objects, features and advantages of the present invention will become more readily apparent from the following description, reference being made to the accompanying drawing in which:

Specific Description

Figure 1:
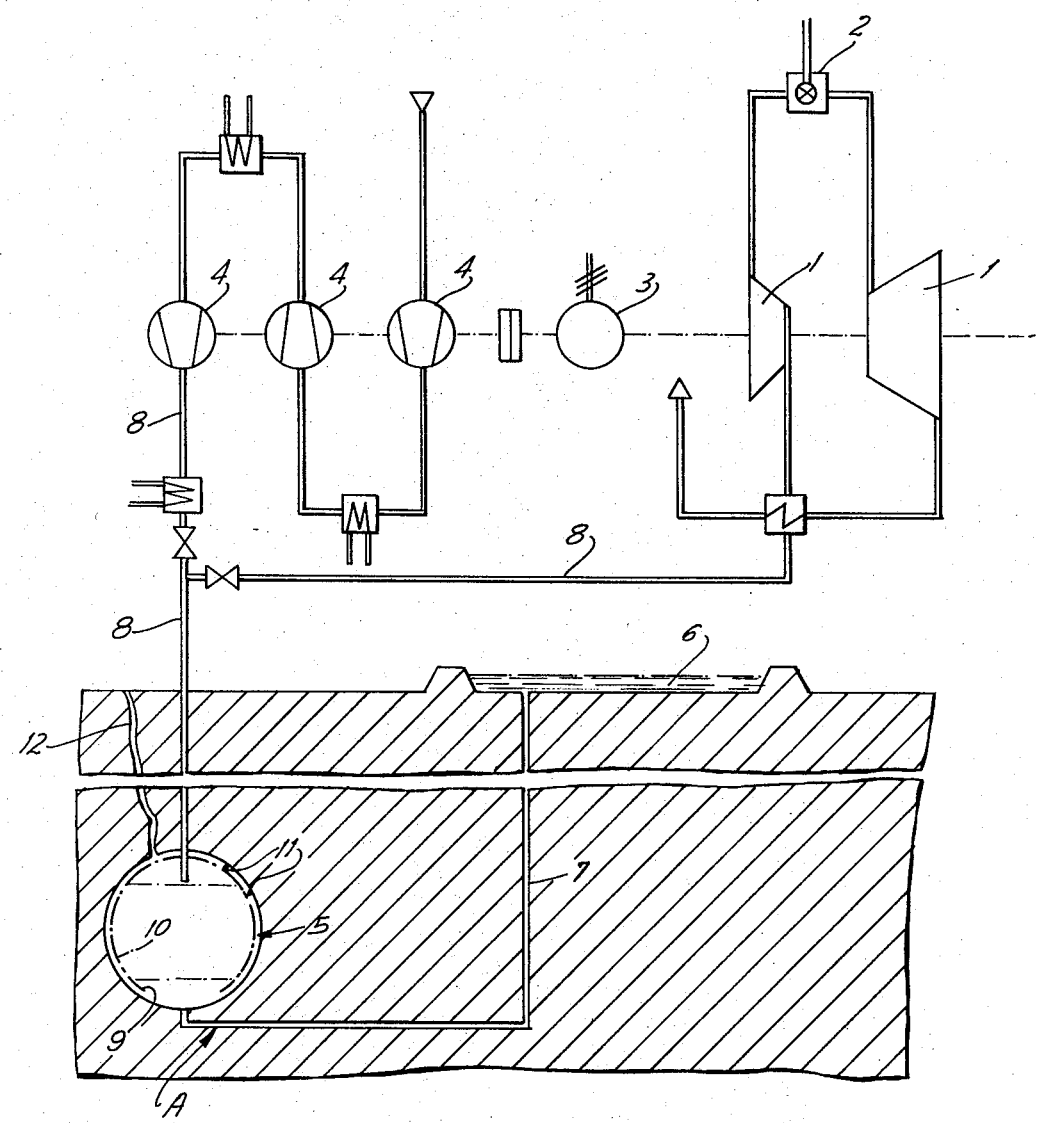
FIG. 1 is a diagrammatic vertical section through a subterranean pressurized-air storage chamber according to the invention, showing the connection thereof to other parts of a power-generating plant.

In the drawing (FIG. 1), I show a plant for the generation of electrical energy which comprises a two-stage turbine 1 having a combustion chamber 2 connected therewith, a generator 3 connected to the turbine rotor, and a three-stage compressor 4 provided with heat exchangers downstream of each stage to cool the compressed air and utilize the heat abstracted therefrom for the preheating of the fuel, of the combustion air or in some other manner. The compressor 4 is connected by the conduit means 8 and appropriate valves either directly to the turbine 1 or the subterranean cavern 5 constituting the pumped-air storage chamber. During peak periods, the conduit means 8 delivers the stored air to the compressor 1. The bottom of the cavern 5 is connected by a riser 7 to a reservoir 6 located above the ground and having a volume significantly larger than the maximum water demand of the cavern 5. The conduit means 8 opens into the space at the top of the downwardly open bell-shaped hood 10 of synthetic-resin foil material, the bottom opening of which is shown at 9. Thus water is able to rise into and within the hood between the levels represented by dot-dash lines. A space is provided between the wall of the hood and the cavern wall (to which the hood is affixed at spaced locations 11) and this space communicates with the atmosphere via the passage 12 leading to the ground surface.

Figure 2:
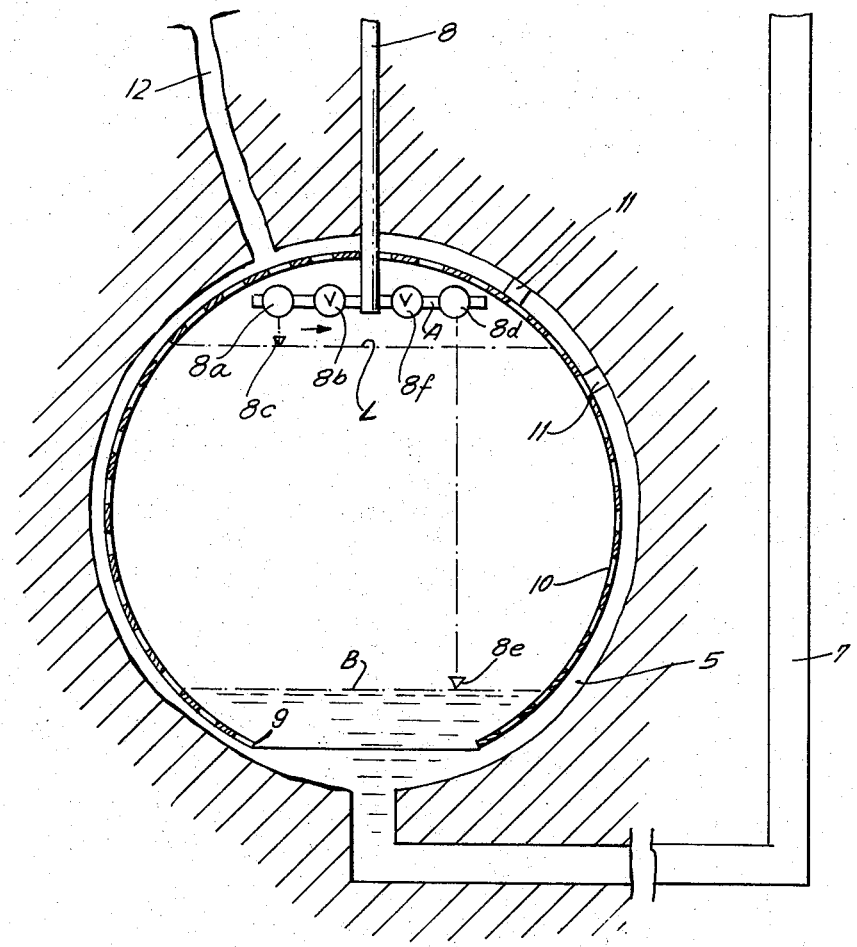
FIG. 2 is an enlarged detail of the cavern.

From FIG. 2 it can be seen that the conduit means 8 is provided with an intake valve 8a in series with a check valve 8b and provided with a float 8c or some other level-detecting device to close off the conduit 8 and prevent further withdrawal of air when the level L reaches its upper limit in which an air space $A_1$ is maintained above the body of water in the hood at the top thereof. The inlet valve 8d is provided with a sensor 8e for detecting the lower level B of water and is closed when the level B, above the mouth 9 of hood 10, is reached. The valve 8d is provided in series with the checkvalve 8a f. Assume, Therefore, that the water is at the level L and compressed air is forced into the subterranean chamber defined by the hood 10. Valve 8b here blocks the outflow of air into the cavern and such outflow is permitted by the valve 8f and valve 8d until the water level is driven down to the level B whereupon the valve 8d closes. When air is released to the turbine from conduit means 8, the valve 8a remains open and air is driven out by the rising water until the level L is reached.

Figure 3:
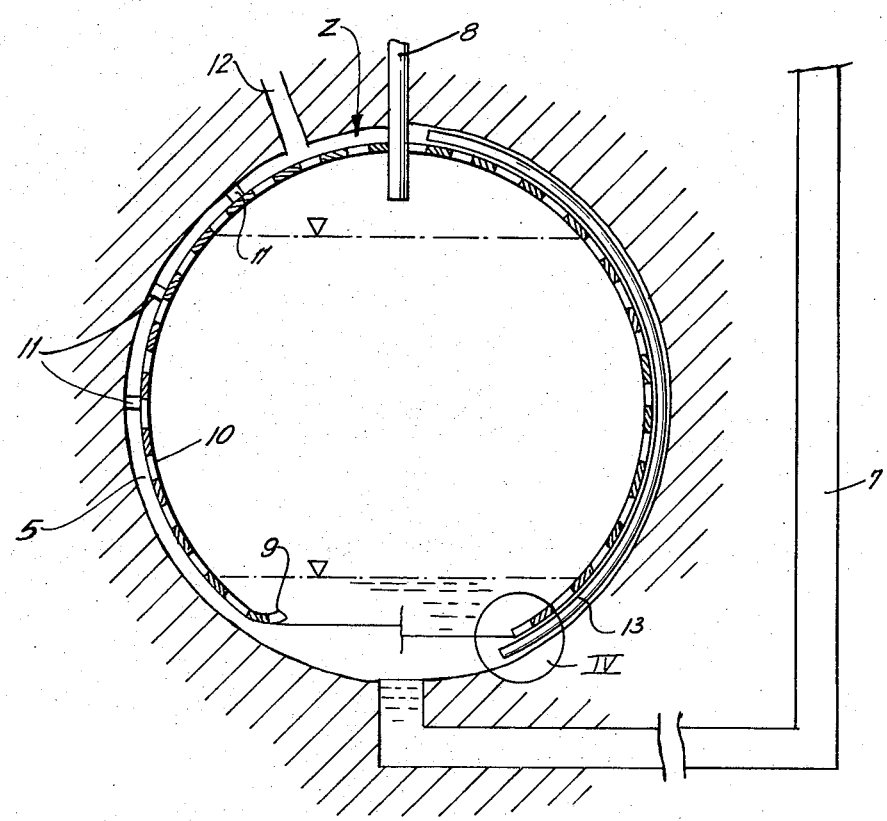
FIG. 3 is a view similar to FIG. 1 illustrating another embodiment of the invention.
Figure 4:
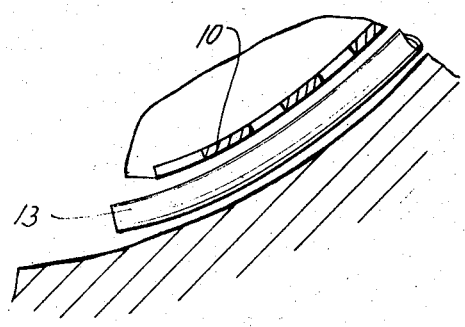
FIG. 4 is a detail view of the region IV of FIG. 3.
Figure 5:
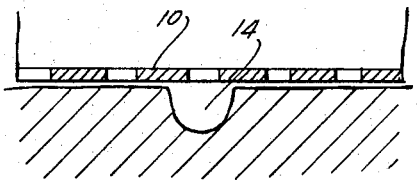
FIG. 5 is a view similar to FIG. 4 illustrating another embodiment of the equlization means of the present invention.

It will be apparent that in the system of FIGS. 1 and 2 there is no direct seal for the water phase in the cavern and indeed the latter is free to rise in the space between the cavern wall and the hood 10, the space being in communication with the ground surface via the passage 12. Of course, if the cavern has crevices into which water can flow, it must be stabilized by flooding for some period until the water system reaches generally a steady state. The foil of the hood 10 is pressed against the wall of the cavern by the pressure which is maintained continuously in the hood and the space Z between the hood and the cavern wall is advantageously provided with equalization or compensating passages which are not blocked even when the foil is pressed fully against the wall. The equalization passages reach from a location at or below the mouth 9 of the hood to a location above the level L thereof as shown in FIG. 3 and may comprise a tube which opens above the top of the hood and below its mouth. Of course, a semitubular member may also be provided, i.e., in the form of a channel whose open end is spanned by the hood 10 over the cavern wall. A channel 14 formed in the cavern wall may also be provided.

I claim:

1. A power-generating system including an electrical generator, a gas turbine connected to said generator, a compressor connected to said turbine and a subterranean air-storage chamber connectable to said gas turbine at least intermittently for supplying air thereto under pressure, the improvement wherein said subterranean chamber comprises:

a cavern below the ground;

a downwardly open bell-shaped generally impermeable hood received in said cavern and supported thereagainst while having a free lower edge spaced from the bottom and lateral walls of said cavern means communicating with the interior of said hood for feeding air to and withdrawing it from said chamber;

a reservoir containing a liquid to a level above the top of said chamber and hydraulically connected to said cavern for applying pressure to air in said hood upon displacement of the liquid by introduction of air into said chamber; and means for maintaining the level of said liquid in said hood above the mouth thereof in a condition of said chamber fully charged with air and below the top of said hood in the fully discharged condition of said chamber.

2. The improvement defined in claim 1, further comprising means for supporting said hood against the wall of said cavern at spaced-apart locations.

3. The improvement defined in claim 1 wherein said hood is composed of a synthetic-resin foil.

4. The improvement defined in claim 1, further comprsiing a pressure-equalization channel connecting the space between said hood and said cavern above the upper level of said liquid and below the lower level of said liquid therein.

5. The improvement defined in claim 4 wherein said channel is a tube between said hood and the cavern wall.

6. The improvement defined in claim 4 wherein said channel is a groove formed formed in the cavern wall.

7. The improvement defined in claim 4 wherein said channel is formed by retaining the mouth of said hood away from the wall of said cavern.

8. The improvement defined in claim 4, further comprising means forming a passage connecting the space between said hood and the wall of said cavern to atmospheric pressure.

* * * * *